Aug. 4, 1936.  G. HEEGEMAN  2,050,005
BEARING PULLER
Filed Dec. 3, 1935  2 Sheets-Sheet 1
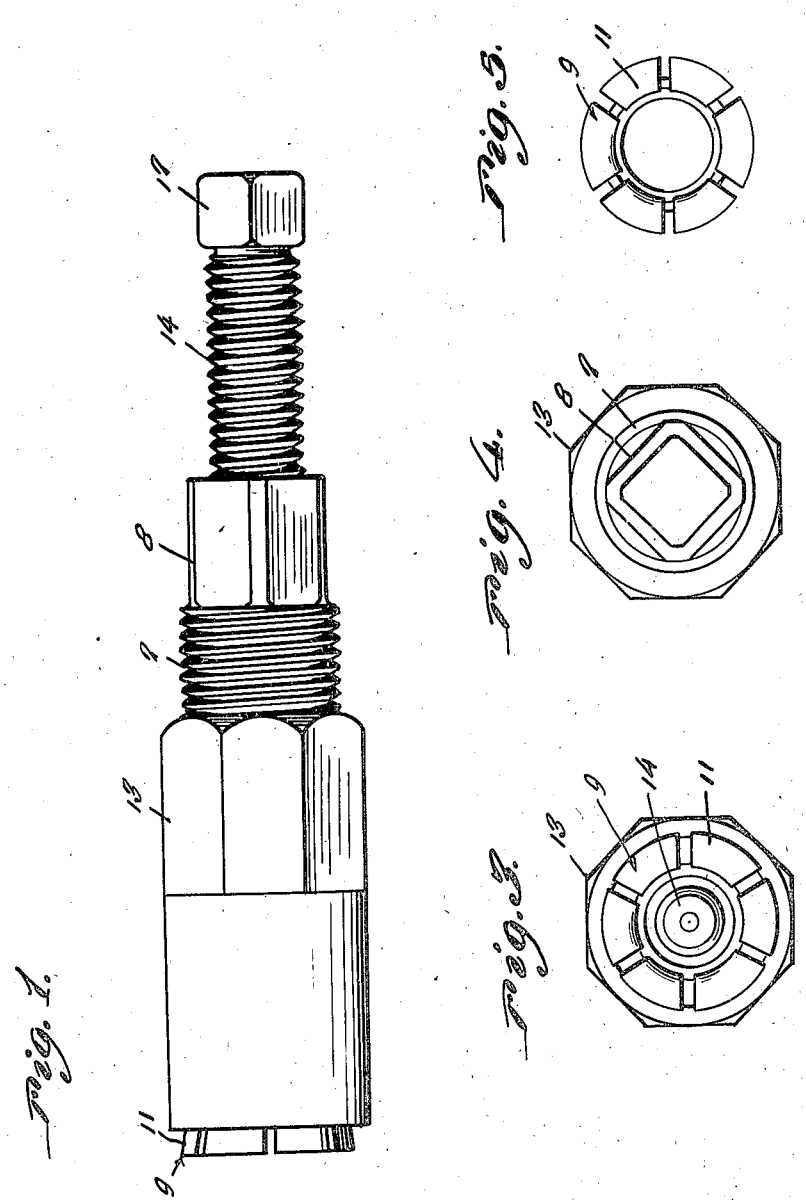
Inventor
George Heegeman
By Clarence A. O'Brien and
Hyman Berman Attorneys Aug. 4, 1936.  G. HEEGEMAN  2,050,005
BEARING PULLER
Filed Dec. 3, 1935   2 Sheets-Sheet 2
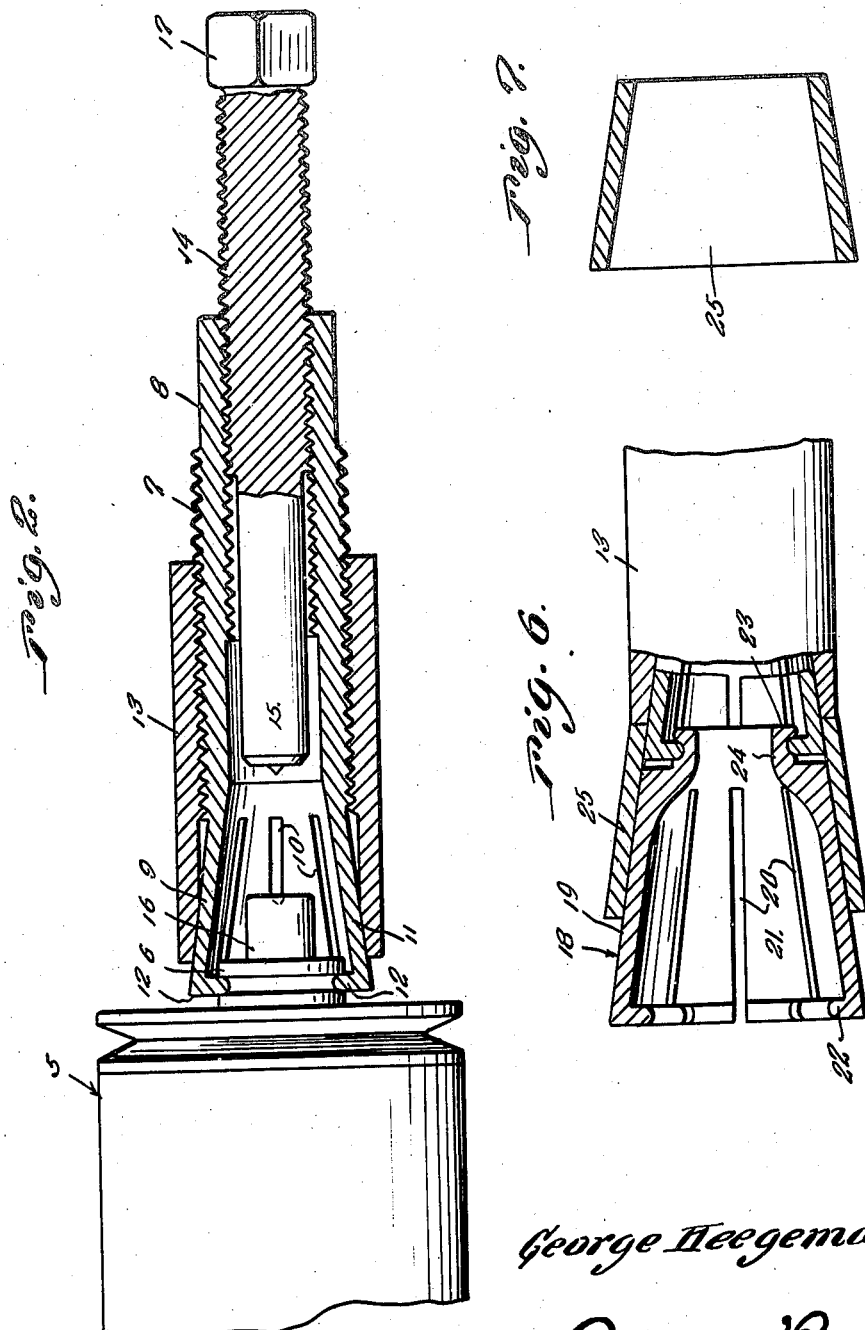
Inventor
George Heegeman
By Clarence A. O'Brien and
Hyman Berman, Attorneys Patented Aug. 4, 1936

2,050,005

UNITED STATES PATENT OFFICE 2,050,005

BEARING PULLER

George Heegeman, Appleton, Wis.

Application December 3, 1935, Serial No. 52,720

1 Claim. (Cl. 29—85)

This invention appertains to new and useful improvements in bearing puller devices and more particularly to a device of this character which is especially adapted for repairing magnetos where it is necessary to take off the bearing race which is fastened to the collector ring.

The principal object of the present invention is to provide a puller of the character stated which can be easily adjusted into position for use which when once positioned will serve effectively for removing the bearing race.

Various other important objects and advantages of the invention will become apparent to the reader of the following specification.

In the drawings.

Figure 1 represents a side elevational view of the device.

Figure 2 represents a longitudinal sectional view of the tool shown applied to a bearing race.

Figure 3 is an end elevational view of the tool.

Figure 4 is an end elevational view of the tool looking at the opposite end from that shown in Figure 3.

Figure 5 represents an end elevational view of the chuck removed from the balance of the tool.

Figure 6 is a fragmentary longitudinal sectional view of the tool with an extension attachment.

Figure 7 represents a sectional view through the collar used with the extension applied.

Referring to the drawings wherein like numerals designate like parts, it can be seen in Figure 2, that numeral 5 generally refers to a magneto which is equipped with a bearing including a race 6, which must be removed when repairing the magneto.

In carrying out the present invention, the tool consists of an elongated internally and externally threaded tube 7 which is provided with a smooth polygonal shaped extension 8 at one end and an outwardly flaring chuck constructed at 9 in its opposite end. This chuck 9 is split inwardly as at 10 at regular intervals to provide elongated spring fingers 11 each of which is provided with an inwardly disposed lug 12 at its free end which can engage into the grooveway of the bearing race 6 as in the manner substantially shown in Figure 2.

Numeral 13 represents the elongated internally threaded sleeve for feedable disposition on the externally threaded portion of the tube 7 and as can be seen in Figure 2, when the lugs 12 have been properly disposed in opposition to the groove of the race 6, the sleeve 13 is fed toward the chuck 9 and by riding the outer end of the sleeve 13 extends the fingers of the chuck, the fingers are contracted so that the lugs 12 engage into the groove of the race 6. Thus the tool is locked or retained on the race and the operation of pulling the bearing race is by feeding the elongated screw 14 inwardly through the tube 7 so that the inner end 15 will engage the shaft 16 of the magneto and thus cause a contracting exertion between the adjacent end of the shaft 16 and the raceway 6 which will cause displacement of the raceway from the shaft. A polygonal head 17 is provided on the outer end of the screw 14 so that the screw can be conveniently rotated by a suitable wrench or the like.

Obviously the tool is not confined to the removal of magneto bearing raceways but can be used for various other purposes and to accommodate raceways or other similar structures a supplemental appliance generally referred to by numeral 18 in Figure 6 can be employed. This structure 18 consists of the supplemental chuck 19 of spring metal, the same being of frustoconical shape with slits 20 formed therein and extending inwardly from the large end thereof to define fingers 21 which have inwardly disposed lugs 22 at their free ends. The reduced end of the chuck 19 is provided with a reduced extension 23 grooved as at 24. This grooved extension is a substitute for the bearing reduced extension is a substitute for the bearing race 6 of Figure 2, for in using the larger chuck 19 the lugs 12 of the chuck 9 are engaged with the extension 23 so as to retain the extension in the frusto-conical shaped contracting sleeve 25 slidable on the chuck 19 by the merging of the sleeve 13 to contract the fingers 21 around the object to be pulled.

While the foregoing specification sets forth the invention in specific terms, it is to be understood that numerous changes in the shape, size and materials may be resorted to without departing from the spirit or scope of the invention as claimed hereinafter.

Having thus described the invention, what is claimed as new is:

A pulling tool comprising an internally and externally threaded tube, said tube being provided with outwardly diverged spring fingers in one end, each of the spring fingers being provided with an inwardly disposed lug at its free end, an elongated threaded member feedable through the tube, and an internally threaded sleeve on the tube for feeding action against the diverged fingers to contract the same, and an auxiliary chuck consisting of a frusto-conical shaped hollow structure slit inwardly from its large end at predetermined intervals to provide spring fingers, each of the said fingers being provided with an inwardly disposed lug at its free end, an extension at its reduced end adapted to be engaged by the lugs of the first mentioned fingers, and a tapering sleeve for slidable disposition on the fingers of the chuck when the first mentioned sleeve is fed against the same.

GEORGE HEEGEMAN.